United States Patent [19]
Angelo et al.

[11] Patent Number: 5,974,250
[45] Date of Patent: Oct. 26, 1999

[54] SYSTEM AND METHOD FOR SECURE INFORMATION TRANSMISSION OVER A NETWORK

[75] Inventors: Michael F. Angelo, Houston; Sompong P. Olarig, Cypress, both of Tex.

[73] Assignee: Compaq Computer Corp., Houston, Tex.

[21] Appl. No.: 08/764,177

[22] Filed: Dec. 13, 1996

[51] Int. Cl.[6] .................................................. G06F 9/06
[52] U.S. Cl. .................. 395/653; 395/712; 395/200.51; 395/187.01
[58] Field of Search ................................. 395/651, 652, 395/653, 712, 200.5, 200.51, 200.52, 186, 187.01, 188.01

[56] References Cited

U.S. PATENT DOCUMENTS

| | | | |
|---|---|---|---|
| 5,230,052 | 7/1993 | Dayan et al. | 395/652 |
| 5,321,840 | 6/1994 | Ahlin et al. | 395/652 |
| 5,388,267 | 2/1995 | Chan et al. | 395/700 |
| 5,421,006 | 5/1995 | Jablon et al. | 395/575 |
| 5,432,939 | 7/1995 | Blackledge, Jr. et al. | 395/652 |
| 5,519,843 | 5/1996 | Moran et al. | 395/430 |
| 5,557,748 | 9/1996 | Norris | 395/200.5 |
| 5,752,042 | 5/1998 | Cole et al. | 395/712 |
| 5,802,592 | 9/1998 | Chess et al. | 395/164 |
| 5,835,761 | 11/1998 | Ishii et al. | 395/653 |

OTHER PUBLICATIONS

Horst, Robert W.; "ServerNet Deadlock Avoidance and Fractahedral Topologies", *Proc. International Parallel Processing Symposium,* Apr. 1996; pp. 1–7.

Baker, William et al.; "A Flexible ServerNet–based Fault–Tolerant Architecture"; *25th International Symposium on Fault–Tolerant Computing;* Jun. 27–30, 1995; pp.1–10.

"Breakthrough Technology for the Coming Generation of Applications" White Paper; *Tandem;* date unknown; pp. 1–18.

Horst, Robert W.; "TNet: A Reliable System Area Network", *IEEE Micro;* Feb. 1995; pp. 1–9.

"Phoenix BIOS Frequently Asked Questions"; *Phoenix;* http://www.ptltd.com/techsupp/biosfaq.html; Oct. 31, 1996; pp. 1–5.

"Micro Firmware/Gateway 2000 BIOS Upgrade FAQ";*Micro* Firmware; Revision 1.2, Jun. 10, 1996; http://www.firmware.com/gwfaq.htm; Oct. 31, 1996; pp. 1–12.

"ServerNet Technology: Introducing the World's First System Area Network" White Paper; *Tandem;* . . . infoctr/brfs__wps/sntssanwp/sntsanwp.htm; Oct. 28, 1996; pp. 1–9.

*Primary Examiner*—Kevin A. Kriess
*Attorney, Agent, or Firm*—Jenkens & Gilchrist P.C.

[57] ABSTRACT

A computer network system having a plurality of nodes, one of which is adapted as an administrator node, the administrator node for securely receiving code information from a code provider disposed external to the network system and for securely sending the code information to at least one of the nodes.

9 Claims, 6 Drawing Sheets

SYSTEM AND METHOD FOR SECURE INFORMATION TRANSMISSION OVER A NETWORK

BACKGROUND OF THE INVENTION

1. Technical Field of the Invention

The present invention generally relates to information transmission techniques over computer network systems. In particular, the present invention is directed to a method and system for securely transmitting code information, for example, the Basic-Input-Output-System (BIOS) image information, to a processor node arranged in a network configuration from a source disposed externally thereto.

2. Description of Related Art

Massive throughput, low latency and zero down-time are some of the most sought-after design goals for today's high-performance, scalable computer networks. These computer networks are optimized for handling applications that are characterized by huge requirements for processing, storage, or communications bandwidth—for example, multimedia, data warehousing, full-motion video, Internet and intranet, and decision support. Furthermore, in order to enhance reliability in highly scalable systems, multiple or redundant paths for fault protection are typically provided in a parallel architecture, thereby increasing the number of constituent processing units many-fold.

In addition to being continuously available, these highly scalable systems must be free from data corruption. Absolute data integrity must be ensured through full self-checking and fault isolation. Dropping or corruption of a few bits of data may be acceptable for applications that deliver sound and image files, but not for electronic commerce, transaction processing, and code update transmissions. For example, it can be readily appreciated by those skilled in the art that when a portion of the Basic-Input-Output-System ("BIOS") code images associated with one or more processor nodes disposed in a network needs to be updated, it is highly efficient and cost-effective to do so by means of software provided over the network if (1) the transmission thereover is tamper-resistant, and (2) the integrity of software can be assured. Clearly, conventional means of physically replacing the Read-Only-Memory ("ROM") -based BIOS image in each of the processor nodes is not only time-consuming but also it significantly adds to overall system down-time.

There have been solutions for updating a BIOS image associated with a processor without having to replace the ROM-BIOS at a provider's site. For example, U.S. Pat. No. 5,388,267 discloses a method and apparatus for updating and restoring BIOS functions while maintaining BIOS integrity. There, a computer is provided with a Flash EPROM for the BIOS in addition to a UV-EPROM containing a redundant copy thereof. The redundant BIOS can be overlaid onto the BIOS address space by selection with a physical switch provided with the computer.

Furthermore, it is well-known that in a network environment BIOS code update information may be provided via a storage medium, for example, a flexible disk, that is supplied by a code vendor or manufacturer. However, such solutions typically involve significant manual intervention thereby adding to the costs.

As can be readily appreciated, achieving secure transmission capability over a network and providing a reliable technique for updating code information—for example, BIOS image information associated with a plurality of processor nodes disposed in such a network—without downtime costs or manual intervention, are clearly related. Although the need for securely providing information, including BIOS image information, over a network has tremendously increased due to the advent such highly-scalable systems as described hereinabove, no prior art solution is known to have all the advantages and novel features of the present invention described and claimed hereinbelow.

SUMMARY OF THE INVENTION

The present invention overcomes the above-identified problems as well as other shortcomings and deficiencies of existing technologies by providing a method and system for securely transmitting code information from a code vendor to at least a processor node disposed in a network comprising a plurality of processor nodes. In a presently preferred exemplary embodiment, such code information comprises BIOS image update information to be used by one or more processor nodes in the network.

In one aspect, the present invention is directed to a method for securely transmitting code information from a code vendor to a network having at least an administrator node and a non-administrator node, the method comprising the steps of: a) signing the code information by the code vendor; b) transmitting the code information from the code vendor to the administrator node; c) validating the code information by the administrator node; d) signing the code information by the administrator node; e) transmitting the code information from the administrator node to the non-administrator node; f) validating the code information by the non-administrator node; g) entering a secure state by the non-administrator node; and h) re-validating the code information by the non-administrator node. The non-administrator node may utilize the code information for updating its BIOS image and, optionally, may save a copy of the previous BIOS image, if adequate memory is available. In a preferred embodiment, signing of the code information comprises: generating an information-integrity-code associated with the code information; encrypting the information-integrity-code; and attaching the encrypted information-integrity-code to the code information. Also, in the presently preferred embodiment, validating or re-validating the code information comprises generating a second information-integrity-code for the received code information; decrypting the encrypted information-integrity-code that is received by an intended processor node; and comparing the decrypted information-integrity-code with the second software-integrity-code.

In another aspect, the present invention is directed to system for securely updating at least a portion of the Basic-Input-output-System (BIOS) code of a processor node using update information provided by a code provider, the processor node being arranged in a network, which network includes at least an administrator node, the system comprising: first secure transmission means for transmitting securely the update information from the code provider to the administrator node; second secure transmission means for providing securely the update information from the administrator node to the processor node; and means in the processor node for modifying a portion of BIOS code using the update information. Further, first secure transmission means preferably comprises: a structure in the code provider for signing the update information; and a structure in the administrator node for validating that the update information is originated by the code vendor. Also, in preferred embodiment, second secure transmission means comprises: a structure in the administrator node for signing the update information; a structure in the processor node for validating that the update information is sent by the administrator node and that the update information is originated by the code vendor; and a structure for effectuating a secure state for the processor node. It is contemplated herein that these structures may be embodied as software, hardware, firmware or combination-type elements.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
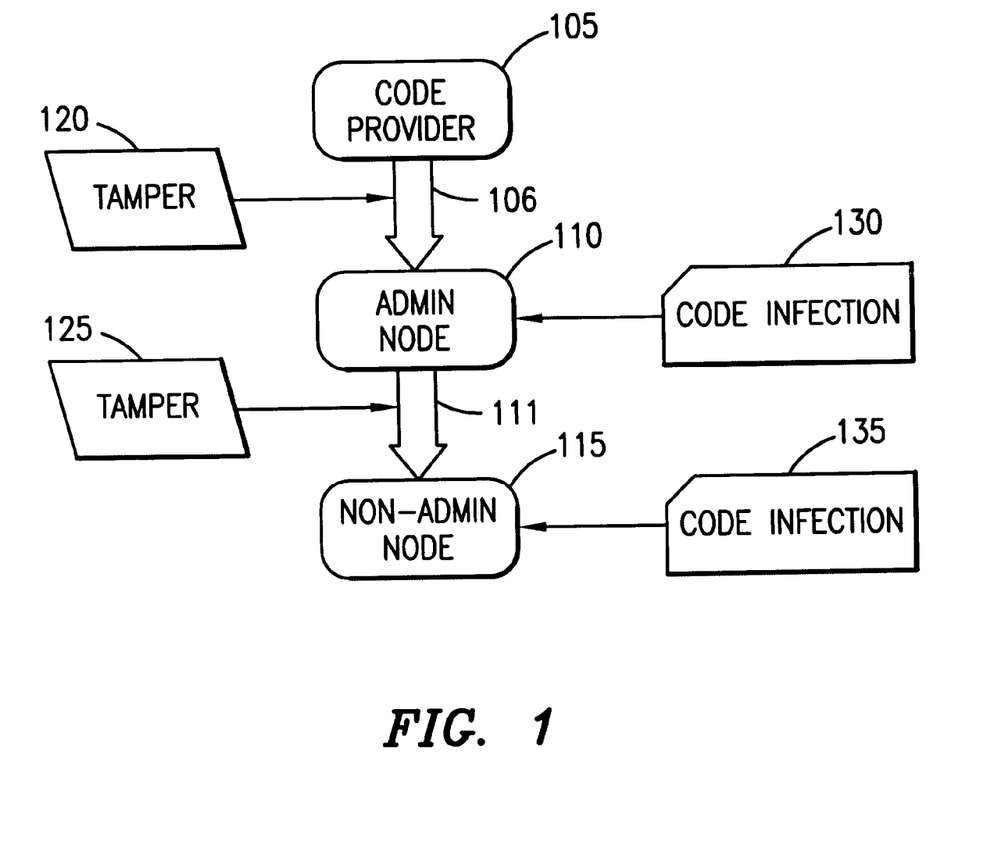
FIG. 1 illustrates a schematic block diagram of information flow from a code provider to a plurality of nodes and exemplary modes of code corruption.

Referring now to the drawings wherein like or similar elements are designated with identical reference numerals throughout the several views, and wherein the various elements depicted are not necessarily drawn to scale, and, in particular, to FIG. 1, there is shown, in schematic form, a block diagram for information flow from a code provider 105 to a plurality of nodes, for example, nodes 110 and 115, and exemplary modes of code corruption. As is well known, nodes 110 and 115 preferably comprise at least a processor unit that may preferably be coupled to a storage unit. It is envisaged herein that the plurality of nodes may be configured in any known topological architecture, for example, the mesh, ring, torus, star (or, alternatively, hub and spoke), tree, fractahedron, or the hypercube architectures. It should further be understood by those skilled in the art that the plurality of nodes may be disposed in any known scalable processing environment, for example, the shared memory, cluster-type, shared device, shared nothing environments, or a system area network ("SAN") environment such as a ServerNet™.

As is well known in the art, when a plurality of nodes are disposed in a network, one or more nodes are preferably endowed with "network-aware" or "cluster-aware" capability. Hereinafter, such nodes will be referred to as administrator nodes. For example, in a SAN environment, an administrator node is typically provided with what is known as a SAN Manager, a software structure that initializes the system and resource configuration of the network upon power up. Also, when the SAN is configured in a star topology, the hub node is typically provided as the administrator node, acting as a "router" for other non-administrator nodes that are connected thereto via radiating spokes.

Continuing to refer to FIG. 1, when code information is transmitted from the code provider 105 to one or more nodes that may preferably be arranged in a network configuration, it is typically received first by the administrator node 110 via a path 106. It is contemplated herein that the path 106 may represent either manual transfer of code information stored on any known medium such as a floppy disk, Compact Disk ("CD"), or the like; or automatic transfer thereof by means of network communication from a remote site owned or controlled by the code provider 105. The automatic transfer of code information may, for example, comprise a file transfer protocol ("ftp") down-load from the code provider 105.

Still continuing to refer to FIG. 1, the code information transmitted from the code provider 105 may preferably comprise update information for updating at least a portion of the Basic Input/Output System ("BIOS") image associated with one or more nodes, for example, node 110 and node 115. Such BIOS update information is commonly referred to in the art as a BIOS "flash." It can be appreciated by those skilled in the art that the integrity of the code information transmitted from the code provider 105, which could be compromised from tamper sources 120, 125, or from such code infection sources 130, 135 as what are commonly known as "software viruses," is of paramount importance when the code information comprises BIOS image update information.

Figure 2:
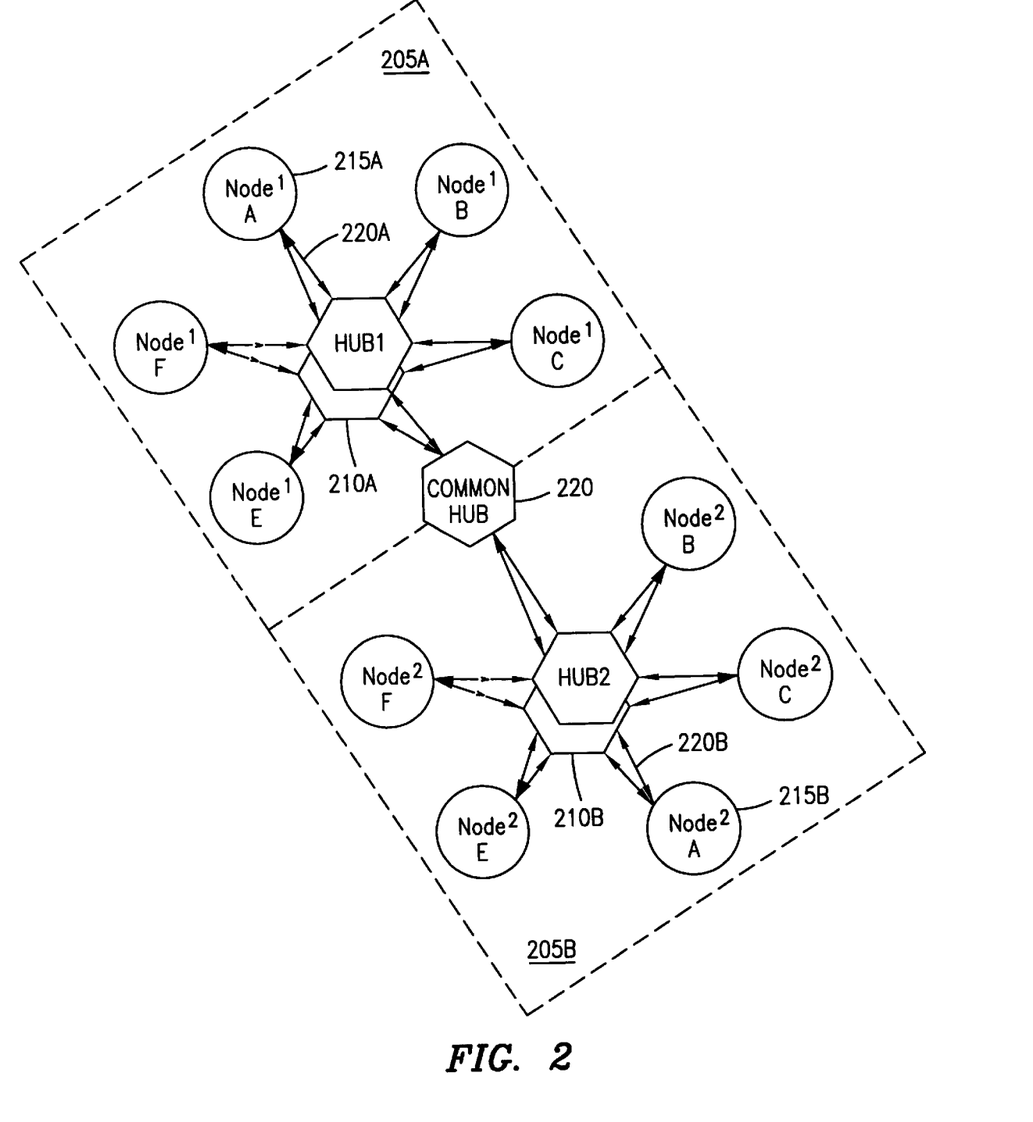
FIG. 2 illustrates a schematic diagram of two exemplary computer networks interconnected together, each exemplary computer network comprising a plurality of nodes and a hub or router.

Referring now to FIG. 2, therein is shown a schematic diagram, generally at 200, of a plurality of nodes arranged in two exemplary interconnected star-configured networks 205A and 205B. Although only two exemplary networks are shown herein, it should be understood that there may be more than two networks with interconnections therebetween. Each network, for example network 205A, comprises a sub-plurality of nodes, for example node 215A, each of which is connected via a bidirectional path, for example spoke 220A, to a hub (or, interchangeably, a router) 210A. Further, it can be seen that exemplary network 205A and network 205B are interconnected together via a common hub 220.

Continuing to refer to FIG. 2, any of the nodes associated with each network, for example network 205A, may be provided with network-aware capability, thereby rendering it an administrator node. However, as is well known in the art, a central hub, for example hub 210A, may preferably be provided with this capability. When code information is transmitted from the code provider 105 (shown in FIG. 1), preferably in response to a code request generated by an administrator node, which in an exemplary embodiment may be hub 210A or hub 210B, it may be targeted to one or more nodes, or one or more hubs in any of the interconnected networks. If, for example, the code information is targeted only to hub 210A, then it is not forwarded or routed to any other node in the interconnected networks. On the other hand, if the code information is intended for the nodes connected to the hub 210A, such information is ultimately routed to them in a secure manner in accordance with the teachings of the present invention as will be described hereinbelow in greater detail.

Figure 3:
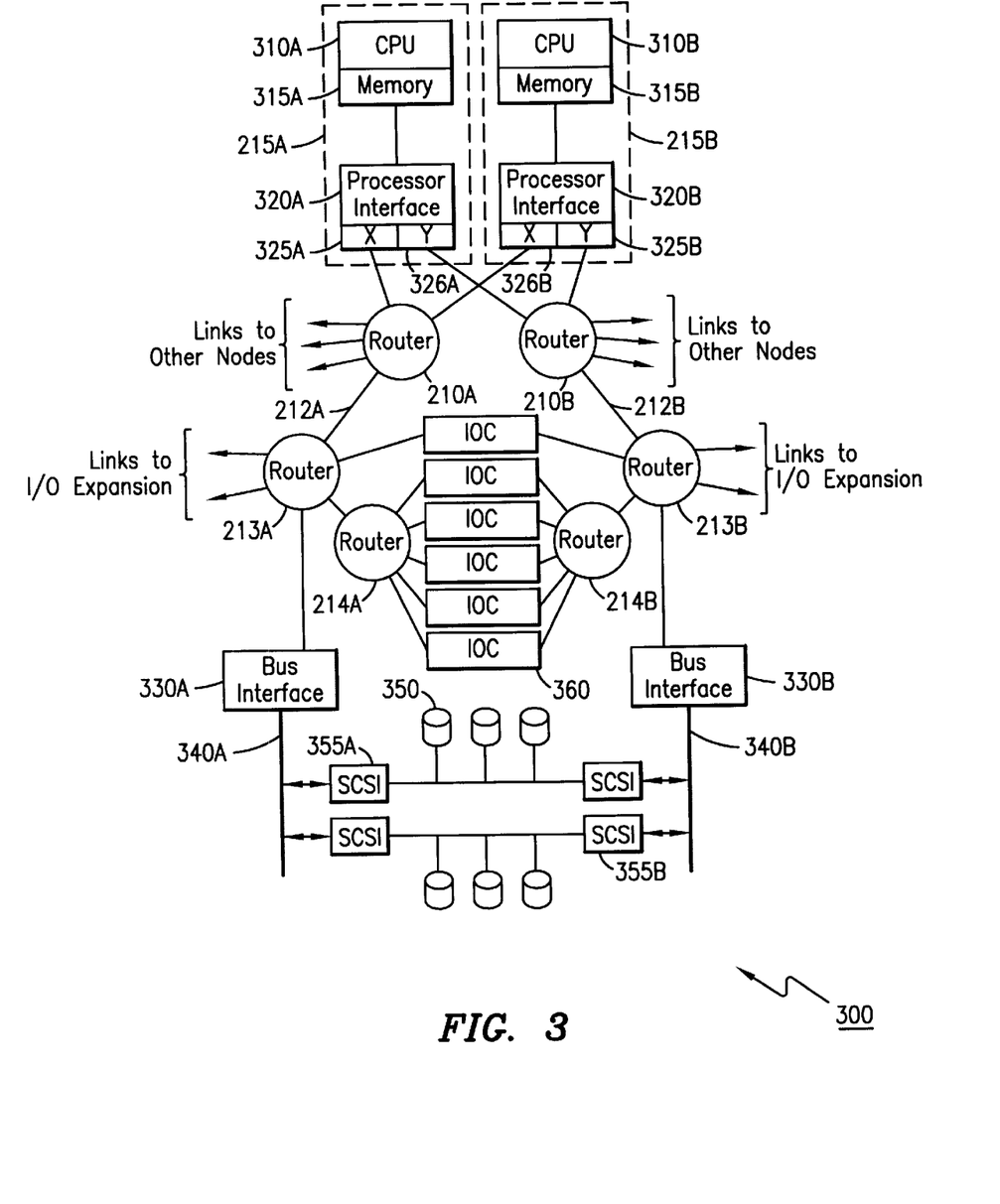
FIG. 3 depicts a block diagram of a presently preferred exemplary embodiment of a computer network in which the present invention may be practiced.

Referring now to FIG. 3, therein is depicted a block diagram of a presently preferred exemplary embodiment of a network, generally at 300, in which the present invention may be practiced. It should be appreciated by those skilled in the art that the network 300 is not a direct replacement of any existing type of Local Area Network ("LAN") or Input/Output ("I/O") bus, but rather a new interconnection layer embodied as a SAN which provides common hardware and software services to a plurality of processor and I/O nodes.

Continuing to refer to FIG. 3, two exemplary nodes, node 215A and node 215B, are depicted in further detail. For example, node 215A comprises a processor (denoted as "CPU") 310A, a memory 315A coupled thereto, and a dual-port network interface 320A having ports 325A and 326B to support a fault-tolerant redundant architecture. One of the exemplary hubs, referred to as router 210A, is interfaced to each of the nodes 215A, 215B via one of the processor interface ports, for example, ports 325A and 326B, contained respectively therein. A parallel-path router 210B is also interfaced to the nodes 215A, 215B via the other network interface ports 326A and 325B to support redundancy.

Each of the routers 210A and 210B may preferably comprise links to other nodes, for example, link 211A and link 211B, respectively, in addition to inter-router connections such as connections 212A and 212B to router 213A and router 213B, respectively. Further, the network 300 may preferably comprise routers, such as router 214A or 214B, that are connected to a plurality of I/O Controller slots, for example IOC 360, for additional storage, communications and router expansion.

Still continuing to refer to FIG. 3, I/O expansion in the network 300 is provided by connecting bus interfaces, for example bus interface 330A and bus interface 330B, to I/O routers 213A and 213B, respectively. Each of the bus interfaces, for example, the bus interface 330A in turn communicates with an I/O bus 340A. An I/O interface, for example a Small Computer System Interface ("SCSI") 355A, is preferably included for providing access to disk storage, for example disk 350.

Figure 4A:
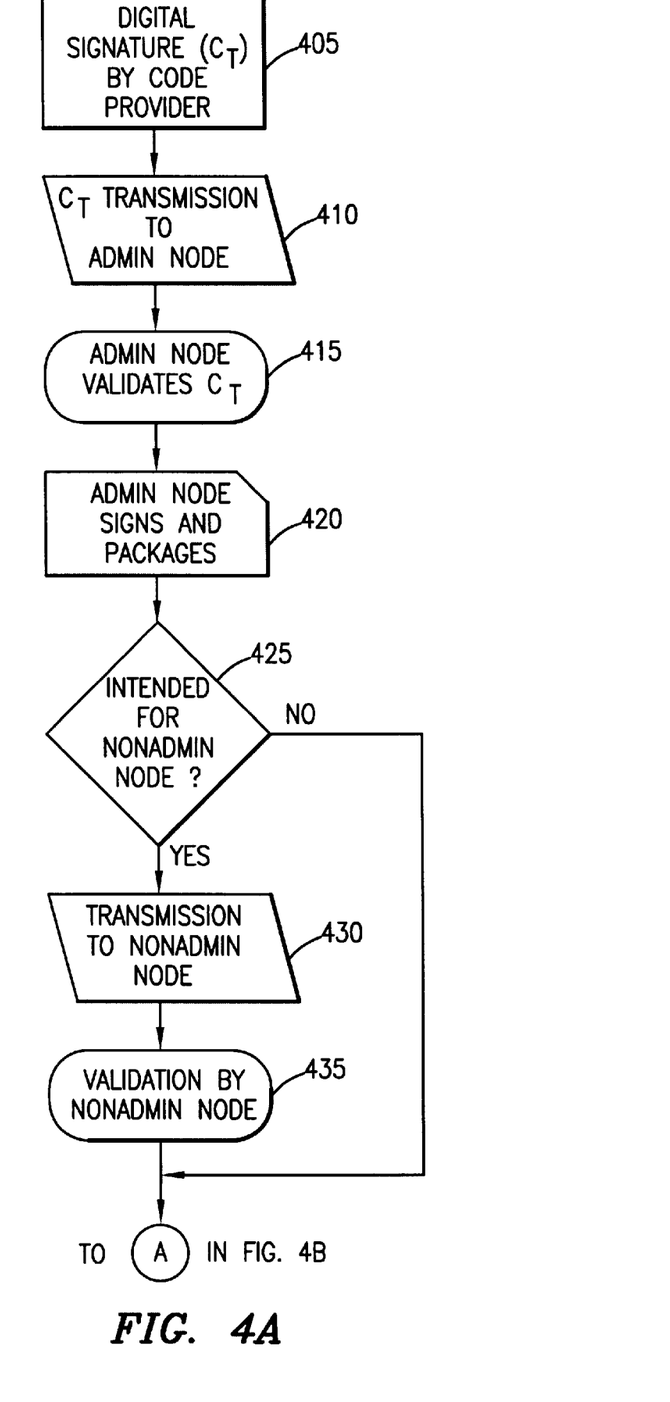
FIGS. 4A and 4B depict an exemplary flow diagram of a presently preferred embodiment of the method of the present invention for securely passing code information from a code provider to at least one node, thereby preferably updating an information image contained therein.
Figure 4B:
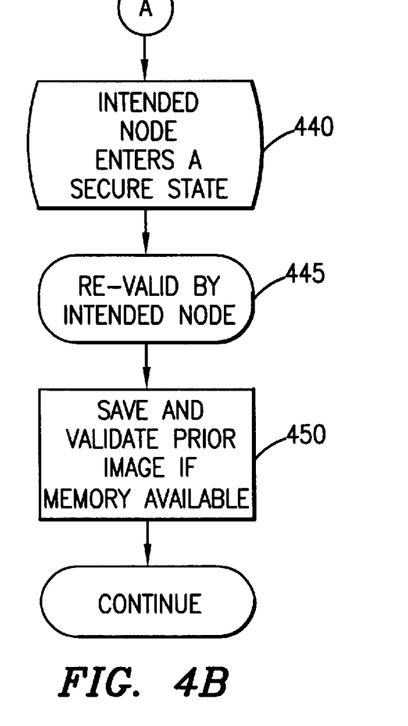

Referring now to FIGS. 4A and 4B, there is depicted an exemplary flow diagram of a presently preferred embodiment of the present invention for securely passing code information from the code provider 105 (shown in FIG. 1) to at least one node, which node may preferably be disposed in a SAN of the type described hereinabove. As provided in step 405, code information is initially signed by the code provider. In step 410, the signed code information, denoted by C, is transmitted to an administrator node, preferably in response to a code update request therefrom. The administrator node validates $C_T$ (step 415) and subsequently signs and packages the code information (step 420). Subsequently, a determination is made as provided in the decision block 425 if the signed and packaged code information is intended for use only by the administrator node or by other non-administrator nodes on the network as well. If the code information is intended for a non-administrator node on the network, then such signed and packaged code information is transmitted thereto as shown in step 430.

Continuing to refer to FIGS. 4A and 4B, once the signed and packaged code information is received by an intended non-administrator node, it is first validated by that node to verify that the received information is sent by the administrator node and that the code vendor created the original code information. This validation process is referenced as step 435. Subsequently, the intended node, which may be the administrator node itself, one or more targeted non-administrator nodes, or any combination thereof, enters a secure state, as provided in step 440. This process will be described in greater detail with reference to FIG. 7 below. After entering a secure state, the intended node re-validates the code information, as shown in step 445. As can be appreciated by those skilled in the art upon reference hereto, if the code information is not re-validated by the intended node after it has entered a known secure state, the integrity of the received code information is suspect and, therefore, it may be discarded without further processing. If the re-validation step 445 is successful, then the integrity of the code information is assured and it may be used by the intended node in such a manner as is appropriate. For example, if the code information is BIOS image information, the intended node updates its BIOS image accordingly and may save its previous BIOS image portions if adequate memory is available (step 450).

Figure 5:
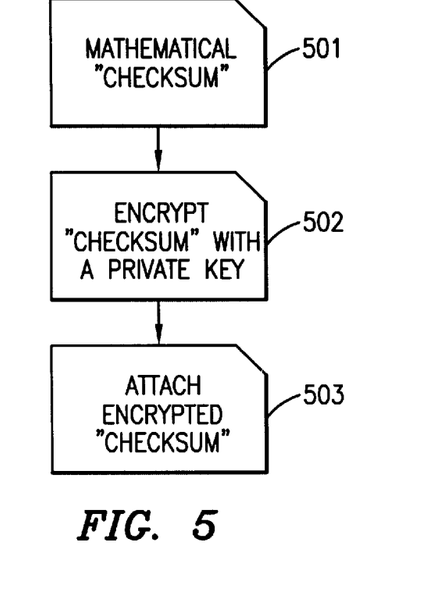
FIG. 5 depicts an exemplary flow diagram for digitally signing code information in accordance with the teachings of the present invention.

Referring now to FIG. 5, an exemplary flow diagram for digitally signing code information in accordance with the teachings of the present invention preferably involves first generating a mathematical "checksum" associated therewith (step 501). It is contemplated herein that the "checksum" according to the teachings of the present invention may encompass not only ordinary checksums and cyclic redundancy checks ("CRCs") that are known to be adequate for detecting accidental modifications of information, but also quantities that are designed for specifically detecting deliberate corruption of data, such as modification detection codes ("MDCs") which are also known in the art as "cryptographic checksums," "cryptographic hashes," "secure hash algorithms," and "message digests." Hereinafter, the phrase information-integrity-code ("IIC") will be used in order to comprehend all these terms and will further be employed interchangeably and synonymously with "checksum."

Continuing to refer to FIG. 5, after generating a suitable mathematical "checksum," it is then encrypted using any known encryption scheme, as is provided in step 502. The encryption scheme may be a conventional symmetric encryption scheme such as the Data Encryption Standard ("DES"). In a presently preferred exemplary embodiment, however, a two-key asymmetric encryption scheme is used for the purpose of encrypting the IIC. For example, the IIC may be encrypted with a private key held only by code vendor 105 (shown in FIG. 1). A public key that corresponds to the code vendor's private key is then made available to a node that needs to validate the received code information. It can be appreciated that the well-known Rivest-Shamir-Adelman ("RSA") algorithm is a useful example of such a two-key encryption scheme.

After suitably encrypting the IIC, the encrypted IIC is then attached to the code information that is to be transmitted to an administrator node disposed in a network. This step is labeled as step 503.

Figure 6:
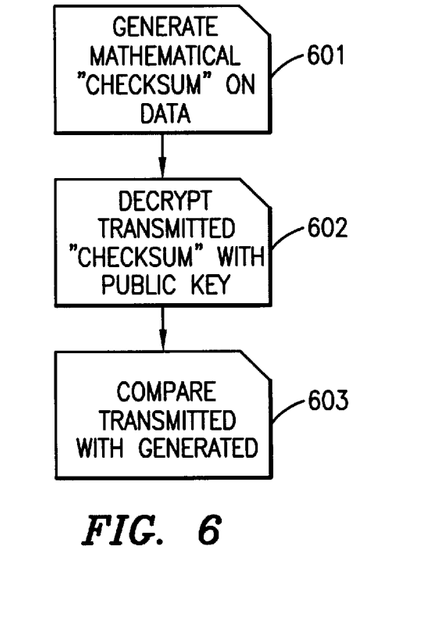
FIG. 6 depicts an exemplary flow diagram for validating received code information in accordance with the teachings of the present invention.

FIG. 6 depicts an exemplary flow diagram for validating received code information by a node in accordance with the teachings of the present invention. As provided in step 601, a second "checksum" on the received data is first created. Subsequently, the received IIC in the encrypted form is then decrypted by the node (step 602). As can be appreciated by those skilled in the art, if the received IIC was initially encrypted by a private key in a two-key system, then the decryption step 602 requires a corresponding public key. The generated IIC (in step 601) is then compared against the decrypted IIC that has been transmitted by the code vender, as provided in step 603. If these two values match, then the validation is successful and the received code information has not been compromised.

Figure 7:
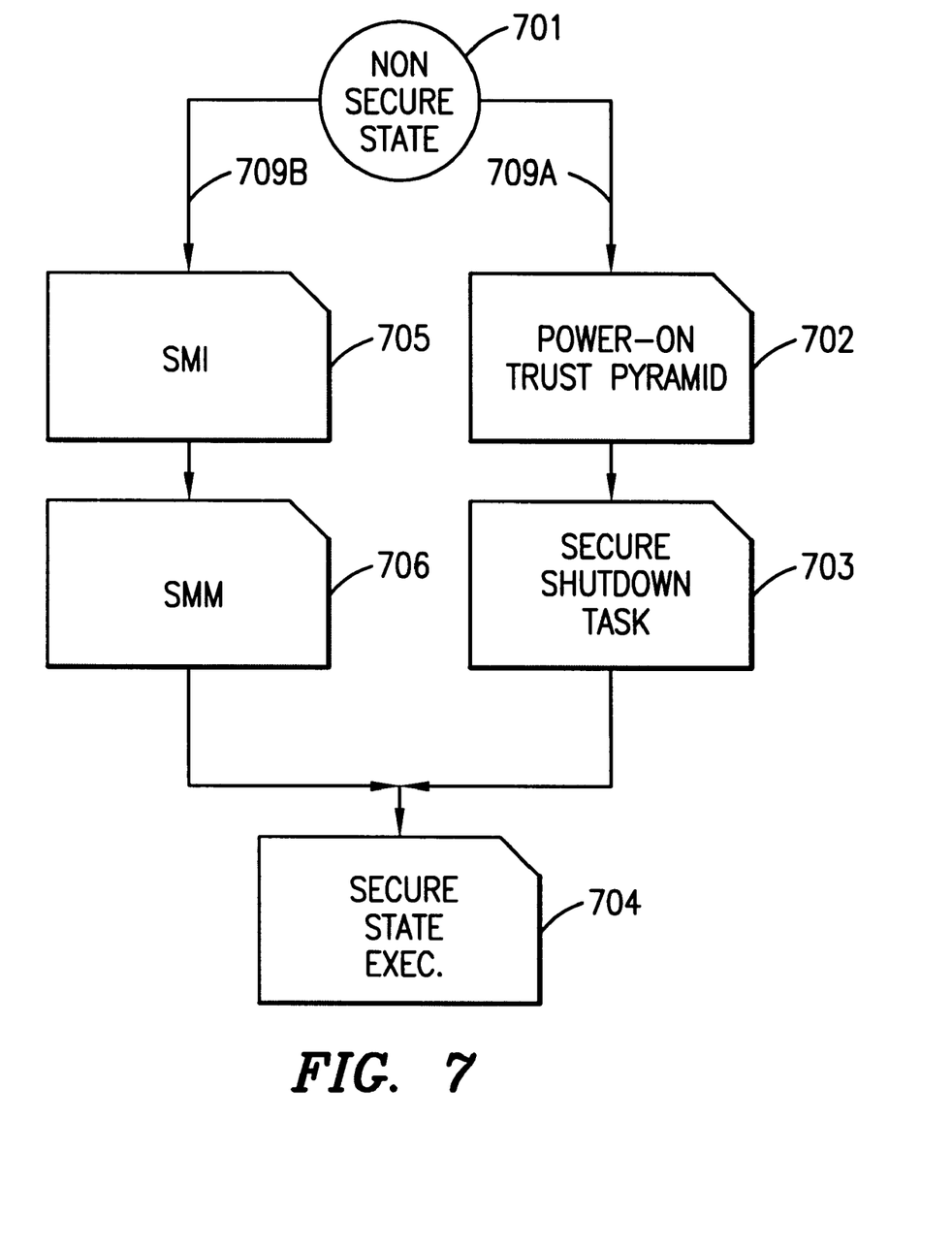
FIG. 7 illustrates an exemplary methodology by which a node enters a secure state in accordance with the teachings of the present invention.

Referring now to FIG. 7, there is shown an exemplary process by which a node enters a secure state in accordance with the teachings of the present invention. Starting from a non-secure state in step 701, a node may enter a secure state by means of at least two separate pathways 709A, 709B. In pathway 709A, a "trust pyramid" is built upon starting from a known state such as a power-on condition via a power cycle. A secure shutdown task (step 703) is initiated and subsequently a secure state executable is run (step 704) so as to initialize a known secure state. This and other methods of preparing a node to enter a secure state are described in greater detail in U.S. Pat. No. 5,421,006, entitled "Method and Apparatus for Assessing Integrity of Computer System Software."

Continuing to refer to FIG. 7, a second pathway, pathway 709B, via generating a System Management Interrupt ("SMI"), may also be used for preparing the node to enter a secure state. By triggering an SMI, the node may be placed into a System Management Mode (steps 705 and 706) which calls for a handler that is located in a secure portion of a memory associated with the node. As can be appreciated, by executing the SMI handler in the SMM the node may be placed into a known secure state.

Those skilled in the art can realize that the teachings of the present invention as described hereinabove provide a cost-effective method for securely transmitting information from a source to one or more computer nodes arranged in a network, for example, a SAN. When the transmitted information is a BIOS image, such information may be securely transmitted with minimal user intervention from a code vender to one or more nodes in need of a BIOS image update.

It can further be appreciated that the present invention provides a robust and tamper-resistant communication channel for code transmission over a network. For example, a possible scenario might be where the administrator node is infected with a virus. The administrator node would first validate the code information from the code vendor assuming that there has been no en route modification. Although the code information is infected with a virus, the administrator node signs the infected information for downstream transmission to intended non-administrator nodes. Upon receiving the infected information, the intended node would validate the sender, that is, the code is in fact transmitted by the administrator node. Subsequently, the intended node would attempt to validate that the code is originated by the code vendor. This second step of validation would fail because the decrypted IIC would not match the generated IIC. Accordingly, the intended node may discard the received information and preferably output an error signal.

Another scenario might be where an intended node is infected with a virus. In this instance, the intended node would first validate in a non-secure state the sender (that is, the administrator node) and the originator (that is, the code vendor) upon receiving the code information. Of course, this condition pre-supposes that there has been no en route modification either between the code vendor and the administrator node, or between the administrator node and the intended node. However, re-validation by the infected node after entering in a secure state would fail because, again, the decrypted and generated IICs would not match.

Although only certain embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, although the RSA public-key cyrptosystem has been presented hereinabove in reference to digital signatures and validation, the present invention may also be practiced with other encryption schemes such as the ElGamal scheme and the knapsack systems.

What is claimed is:

1. A method for securely transmitting code information from a code vendor to a network having an administrator node and a non-administrator node, at least one which nodes being an intended node for securely receiving the code information, the method comprising the steps of:

a) signing said code information by said code vendor;

b) transmitting said code information from said code vendor to said administrator node;

c) validating said code information by said administrator node;

d) signing and packaging said code information by said administrator node;

e) transmitting said code information from said administrator node to said non-administrator node if said code information is intended for said non-administrator node;

f) validating said code information by said non-administrator node upon receiving said code information;

g) entering a secure state by said intended node; and h) re-validating said code information by said intended node.

2. The method as recited in claim 1, wherein said step (b) is performed in response to a code update request generated by said administrator node.

3. The method as recited in claim 1, wherein each of said step (a) and said step (d) further comprises the steps of:

generating an information-integrity-code ("IIC") associated with said code information;

encrypting said IIC; and attaching said encrypted IIC to said code information.

4. The method as recited in claim 3, wherein each of said step (c), said step (e) and said step (h) further comprises the steps of:

creating an IIC on received data;

decrypting said encrypted IIC; and comparing said created IIC with said decrypted IIC.

5. The method as recited in claim 1, wherein said step(g) further comprises the step of entering a trusted state by performing a power cycle.

6. The method as recited in claim 1, wherein said step(g) further comprises the step of triggering a System Management Interrupt.

7. A system for securely updating at least a portion of the Basic-Input-Output-System (BIOS) code of a processor node using update information provided by a code provider, said processor node arranged in a network, which network includes at least an administrator node, the system comprising:

first secure transmission means for transmitting securely said update information from said code provider to said administrator node;

second secure transmission means for providing securely said update information from said administrator node to said processor node; and means in said processor node for modifying said portion of BIOS code using said update information, said processor node comprising means to enter a secure state, wherein said means for modifying is operable after it is determined that said processor node has entered said secured state.

8. The system as recited in claim 7, wherein said first secure transmission means for transmitting further comprises:

a structure in said code provider for signing said update information; and a structure in said administrator node for validating that said update information is originated by said code vendor.

9. The system as recited in claim 8, wherein said second secure transmission means further comprises:

a structure in said administrator node for signing said update information; and a structure in said processor node for validating that said update information is sent by said administrator node and that said update information is originated by said code vendor.

* * * * *